United States Patent Office 3,101,265
Patented Aug. 20, 1963

3,101,265
METHOD FOR PREVENTING UNDESIRED PLANT GROWTH
Edgar J. Smutny, San Francisco, and Samuel B. Soloway, Linda C. Dowding, and Johannes Van Overbeek, Modesto, Calif., assignors to Shell Oil Company, New York, N.Y., a corporation of Delaware
No Drawing. Filed Mar. 6, 1961, Ser. No. 93,372
9 Claims. (Cl. 71—2.7)

This invention relates to novel plant growth-modifying compositions of matter, and to their use in controlling—including preventing or destroying—undesired plant growth.

The plant growth compositions provided by this invention contain, as an active growth-modifying agent, at least one compound containing a sulfonium moiety of the formula:

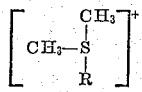

wherein R represents a methyl or ethyl group. These biologically active sulfonium compounds are ionic, salt-like compounds, and for the sake of brevity and convenience of description will be disignated herein as salts, and the sulfonium moiety will hereinafter be referred to as the sulfonium cation, or simply as the sulfonium ion. It is to be noted that although these sulfonium compounds are referred to as salts, the designation is based upon their structure and character, and not necessarily upon the way in which they may be formed. While these sulfonium compounds may be formed by reaction of the appropriate sulfonium base with a suitable acid, in many cases it will be found more convenient and/or effective to prepare them in other ways, as will be set out in detail hereinafter.

It has been found that a variety of these compounds, involving a variety of both anions and these sulfonium ions, markedly modify the growth of plants contacted by them. It also has been found that the charcter of the anion acts only to modify the intensity of the biological activity and/or the kind of activity—that is, the type of plant whose growth will be modified by a particular sulfonium salt—but does not destroy the activity of the sulfonium ion.

The suitable anions include those of inorganic acids, their partial salts and/or their partial low-molecular-weight esters, as well as those of organic acids, and their partial salts and/or esters.

Examples of suitable anions include the following, which are included for the purpose of illustration only, and are not to be considered as limiting in any sense:

Halide ions, including the chloride, bromide, iodide and fluoride ions;

The acid sulfate ion, $HSO_4^-$, and its esters $R^0SO_4^-$, wherein $R^0$ is an organic group of up to 10 carbon atoms, preferably a hydrocarbon, halogen-substituted, or nitro-substituted hydrocarbon group, for example, an alkyl (including both straight-chain alkyl), haloalkyl or aryl group, such as the unsubstituted phenyl and naphthyl groups, an alkaryl group such as the tolyl and ethylphenyl groups, the nitrophenyl group, mono- and poly-halophenyl groups and the like, a cycloalkyl group, such as the cyclopentyl, cyclohexyl and 3,3,5-trimethylcyclohexyl groups, and their halogen-substituted analogs, an aralkyl group, such as the benzyl, phenethyl, and alpha-methylbenzyl groups, and their halogen-substituted analogs, such as alpha-chlorobenzyl, p-chlorophenyl, and like groups;

The chlorate ion and perchlorate ion;
The thiocyanate ion;
The nitrate ion;

The phosphate ion, $PO_4^{-3}$, its partial esters, $R^0PO_4^=$ and $(R^0)_2PO_4^-$; the acid phosphate ions, $H_2PO_4^-$ and $HPO_4^=$;
The cyanide ion;
The borate ions, $BO_2^-$, $BO_3^{-3}$, $B_4O_7^{-2}$;
The carbonate ion and the bicarbonate ion;
The chromate ion;
The permanganate ion;
The arsenate ions, $AsO_3^-$, $As_2O_7^{-4}$, $H_2AsO_4^-$, and arsenite ions;
The carbamate ions, $H_2NC(O)O^-$;
Anions derived from sulfuonic acids.

In these acids the organic portion can be of any configuration—that is, the organic portion can be aliphatic, cycloaliphatic, aromatic or of mixed character, as in the araliphatic and aliphatic-substituted aromatic sulfonic acids. The aliphatic sulfonic acids can be of either straight-chain or branched-chain configuration. While they suitably may be olefinically unsaturated, preferably they are free from acetylenic unsaturation. Examples of suitable sulfonic acids are the alkanesulfonic acids of up to about 10 carbon atoms. Both the monosulfonic acids, $R'—SO_3H$ (wherein $R'$ is the organic group) and the polysulfonic acids, $R'(SO_3H)_n$, wherein $n$ is an integer greater than one, are suitable. Typical of these sulfonic acids are methanesulfonic acid, methane disulfonic acid (methanoic acid), ethanesulfonic acid, the isomeric $C_3$-, $C_4$-, $C_5$- and like sulfonic acids. The partial esters of the polysulfonic acids wherein each of the ester groups is a group represented by the symbol $R^0$ also are suitable. Other sulfonic acids are the aromatic sulfonic acids, such as benzenesulfonic acid, toluenesulfonic acid, naphthalenesulfonic acid, and the like. Desirably, these sulfonic acids, too, contain not more than about 10 carbon atoms. In these sulfonic acids, the alkane group or aromatic group can be substituted, the preferred substituent groups being the nitro group and the halogen atoms.

Anions derived from carboxylic acids, and these can be of any configuration—aliphatic, cycloaliphatic, aromatic or mixed—and may contain but one, or a plurality of carboxyl groups. The aliphatic acids can be of straight-chain or of branched-chain structure. In the polycarboxylic acids, the partial esters, each ester group being one represented by $R^0$, also are suitable. These acids, too, can be olefinically unsaturated, but preferably are free from acetylenic unsaturation. Examples of suitable carboxylic acids include the alkane carboxylic acids preferably those containing from 1 to 10 carbon atoms, such as formic acid, acetic acid, propionic acid, the isomeric $C_4$-, $C_5$-, and like acids, the alkene dicarboxylic acids, such as oxalic, malonic, maleic, succinic, glutaric, adipic and like dicarboxylic acids. Substituted alkane carboxylic acids also are suitable, examples being the hydroxy-substituted carboxylic acids, glycolic acid, lactic acid, hydroxybutyric acids, tartaric acid, and the like, the amino-substituted carboxylic acids, 3-aminopropionic acid, 3-aminohexanoic acid and the like, keto-substituted acids such as methoxyacetic acid, pyruvic acid, acetoacetic acid and levulinic acid, halogen-substituted carboxylic acids, such as fluoroacetic, chloroacetic, trichloroacetic, alpha-chloropropionic acid, and alpha,beta-dichloropropionic acid, the lower naphthenic and hydroxy-naphthenic acids, such as (3-ethyl-4-methyl-1-cyclopentanyl)acetic, butyric and valeric acids and their hydroxy derivatives. Also suitable is arsonoacetic acid.

Examples of aromatic carboxylic acids include the unsubstituted aromatic carboxylic acids, such as benzoic acid, and the phthalic acids, the hydrocarbon-substituted aromatic acids, such as the toluic acids, the araliphatic acids, such as phenylacetic acid, phenylpropionic acid and the like, the non-hydrocarbon substituted aromatic acids, such as the chlorobenzoic, chlorotoluic, nitrobenzoic, hydroxybenzoic (salicylic) acids, anisic acids, gallic acids, syringic acids, anthranilic acids, thiolbenzoic acids, mandelic acid, tropic acid, benzoylformic acid, 3,6-endoxohexahydrophthalic acid, (2,4,5-trichlorophenoxy)acetic acid, (2,4-dichlorophenoxy)acetic acid, picric acid and the like.

Salts of aprotonic Lewis acids also are suitable, the principal acids of this type being the metal halides, oxides of phosphorus, sulfur, the halides of phosphorus boron, sulfur and silicon and the oxyhalides of phosphorus and sulfur.

To further illustrate precisely the character of these biologically active sulfonium salts, the following species thereof are set out as typical examples: trimethylsulfonium bromide, ethyldimethylsulfonium chloride, trimethylsulfonium iodide, trimethylsulfonium trichloroacetate, the trimethylsulfonium salt of (2,4-dichlorophenoxy)acetic acid, the trimethylsulfonium salt of (2,4,5-trichlorophenoxy)acetic acid, and the like.

These sulfonium salts are, in part, known compounds, and methods for preparing all of these salts are shown in the art. Probably the best summary of the chemistry of sulfonium salts and their preparation is given in the article by Goerdeler, "Methoden zur Herstellung und Umwadlung von Sulfoniumverbindungen"—H o u b e n-Weyl, "Methoden der Organischen Chemie," G. Thiene Verlag, 4th edition, 1955, volume 9, pages 175–194. In most cases, the most convenient method for their preparation involves reaction of a thioether, RSR' with a suitable aliphatic derivative of the anion of the inorganic acid—i.e., an aliphatic halide, R''X, an aliphatic sulfate, $R^oR''SO_4$. The reaction generally is most conveniently conducted in the presence of a suitable solvent, such as acetone, nitromethane, or the like. Control of the reaction temperature generally will enable control of the character of the desired product—that is, in some cases, where a sulfonium compound rather than a trimethylsulfonium compound is desired, it may be most convenient to first form the trimethylsulfonium compound, then to add a suitable ethyl compound, and by disproportionation form the desired other compound; control of the reaction temperature will enable control of the degree of disproportionation.

Where the acid used is more soluble in liquid hydrocarbons or other organic solvent than in water, suitably the liquid hydrocarbon or the other organic solvent is most conveniently used. If the compound of the sulfonium cation is not soluble therein, a consolute mixture with a suitable solvent may be used, or there may be used a mutual solvent system.

The concentrations of the various compounds in the various solvents is not critical, in general the amounts being chosen to permit the necessary amount of salt formation with a minimum of operational difficulties.

The following examples illustrate the manner in which typical species of these sulfonium salts have been prepared:

Example I 300 grams (5.1 moles) of dimethyl sulfide was dissolved in one liter of acetone. 449 grams (4.7 moles) of methyl bromide were bubbled into the solution at room temperature. The mixture was allowed to stand overnight. A solid product was separated, washed with dry ether and dried in an oven. There was obtained 525 grams of trimethylsulfonium bromide melting at 204° C. (literature: trimethylsulfonium bromide melts at 202° C.), representing a 72% yield.

Example II

In the manner set out in Example I, trimethylsulfonium chloride was prepared by reaction of dimethyl sulfide and methyl chloride in 75% methanol. A pressure of 500 pounds per square inch gauge was employed, and the reaction temperature was 150° C.

Example III

Trimethylsulfonium chloride also was obtained by metathetic reaction between trimethylsulfonium bromide and silver chloride in water.

Example IV

Trimethylsulfonium methyl sulfate was prepared by dissolving dimethyl sulfide (1 mole) in acetone (100 milliliters) and adding dimethyl sulfate (1 mole) dropwise, the reaction temperature being maintained at 56° C. or below by cooling. 171 grams (90%) yield of trimethylsulfonium methyl sulfate was obtained. Identification of the product was by elemental analysis.

Example V

Trimethylsulfonium perchlorate was prepared by slowly adding 5 milliliters of perchloric acid to a cold (15° C.) solution of 20 grams of trimethylsulfonium bromide dissolved in 100 milliliters of methanol. Trimethylsulfonium perchlorate precipitated and was collected and washed with cold methanol. 21 grams were obtained. Analysis confirmed the identity of the perchlorate: the product was found to contain 18.4 percent by weight of sulfur. Trimethylsulfonium perchlorate contained 18.1 percent of sulfur. As in the case of many perchlorates, trimethylsulfonium perchlorate is sensitive to shock and may explode if handled roughly. While an excellent herbicide, in use it must be handled with great care.

Example VI

Ethyldimethylsulfonium bromide was prepared by refluxing a mixture of 44 grams of ethyl bromide, 37 grams of methyl sulfide and 50 milliliters of acetone at about 45° C. for 3 hours, after which the mixture was allowed to stand overnight at room temperature. The crystalline product was filtered from the mixture, washed with ether and dried in vacuum. Yield: 8 grams. The filtrate was refluxed for an additional 6 hours, yielding a further 5 grams of product. The product was analyzed: Found: Percent w. bromine, 46.8; percent w. sulfur, 18.7. Theory for ethyldimethylsulfonium bromide: Percent w. bromine 46.7; percent w. sulfur, 18.4. The identity of the ethyldimethylsulfonium bromide was further confirmed in infrared spectrum analysis.

Example VII

Trimethylsulfonium thiocyanate was prepared by mixing a solution of 47.1 grams of trimethylsulfonium bromide in 100 milliliters of methanol with a solution of 29.1 grams of potassium thiocyanate in 150 milliliters of acetone and 50 milliliters of methanol. 32 grams of a precipitate (potassium bromide) was collected. The filtrate was concentrated under vacuum to give a white liquid residue. Acetone was added and the mixture shaken. The mixture then was filtered to remove more potassium bromide. The filtrate was chilled to give 30 grams of product melting at 63–64° C. after recrystallization from isopropyl alcohol and identified as trimethylsulfonium thiocyanate by elemental analysis.

Example VIII 50 grams of trimethylsulfonium bromide was dissolved in 200 milliliters of methanol. 94 grams of silver trichloroacetate was dissolved in 200 milliliters of methanol. The sulfonium bromide solution was added to the constantly stirred silver salt solution. 60 grams of silver bromide precipitated and was removed by filtration. The filtrate was concentrated, yielding 79 grams of moist solid. The solid was recrystallized twice from isopropyl alcohol. 43 grams of the trimethylsulfonium salt of trichloroacetic acid were obtained. Melting point: about 90° C. The identity of the product was confirmed by elemental and infrared spectrum analysis.

Example IX 14 grams of trimethylsulfonium chloride was dissolved in 150 milliliters of methanol. 19 grams of ferric chloride was added. The resulting solution was allowed to stand overnight, then was concentrated on a water aspirator. 32 grams of solid were obtained. On recrystallization from isopropyl alcohol, 31 grams of trimethylsulfonium chloroferrate, identified by elemental analysis, was obtained.

In a manner similar to that of the preceding examples, trimethylsulfonium p-toluenesulfonate was prepared from methyl p-toluenesulfonate and dimethyl sulfide.

In those cases where the kind of activity of the sulfonium salt is influenced by the particular anion present, it is not necessary that the salt be recovered and isolated for it to be used as a herbicide. The reaction mixture containing equivalent amounts of each of the sulfonium ion and the anion is as effective as the isolated salt.

It has been found that these sulfonium salts control growth of plants by attacking and destroying the growth points—i.e., the buds—of the plants. At low concentrations, at least, the sulfonium salts do not appear to be general plant poisons. These characteristics dictate the manner in which these salts can be most effectively used to control growth of plants. Thus, the effects of the salts are most pronounced when the salts are brought into contact with a living plant, rather than by introducing the salts into the soil in which the plant is growing. These salts thus are most effectively used in post-emergence application to growing plants. Further, the fact that the salts primarily act to destroy growth points suggests their use to prevent further growth of established plants without killing those plants by selection of a suitable concentration of the salt or salts used. This use of these sulfonium salts has been demonstrated in the case of perennial grasses, such as Bermuda grass, for it has been found that at low concentrations, sulfonium salts do not kill the grass, but effectively prevent its further growth. At higher concentration of the salts, the grass may be entirely killed. It is thus possible, for example, to use the sulfonium salts to prevent spread of an already established perennial grass lawn, parking area cover, or the like. Alternatively, the sulfonium salts can be used as effective herbicides, to destroy unwanted plant growth.

These sulfonium salts have been found, generally speaking, much more toxic toward grasses and other narrow-leaved plants, than toward broad-leaved plants. In particular, these salts are highly active with respect to perennial grasses, a unique and very desirable characteristic. Further, they have been found to be nearly inert and non-toxic toward such broad-leaved plants as the legumes—peas, clover, soybeans and the like—and the cole crops—radish, cabbage, cauliflower, Brussels sprouts and the like—another very desirable characteristic. Still further, within this class of sulfonium salts, the plant growth-modifying properties of individual species will vary somewhat from these general characteirstics, some of the species being more or less active to some plants than are other species. The usefulness of these sulfonium salts—as a class—as plant growth-regulating agents thus is increased, since the variation in properties between different species of the class permits selection of an agent to fit exactly the requirements of a given application.

Most, if not all, of these sulfonium salts are soluble in water. Further, they have been found to be toxic toward duckweed (*Lemna minor*), an aquatic plant. Consequently these sulfonium salts also will be of value as aquatic herbicides.

The sulfonium salts which are substantially soluble in water ordinarily will be most conveniently applied in the form of a solution of the chosen salt or salts in water. The concentration of the herbicide which will be most effective in any given case will depend upon a number of factors, such as the particular salt used, the kind of plant or plants on which it is to be used, whether or not there is also present one or more kinds of plants which must not be destroyed, whether the application is to provent growth or to kill the plants, whether or not one or more adjuvants are present in the composition, and if so, their character, the character of any other materials which may be present in the herbicide composition, and the like. Effective resolution of these factors is within the skill of those well versed in the herbicide art. As a general matter, the concentration of the sulfonium salt herbicide suitably may be as little as a few parts per million of the composition, or it suitably may be as much as 5 or 10 percent of the weight of the composition. In compositions to be employed as concentrates, the active agent may be present in a concentration up to the maximum solubility of that agent in the water, or even greater by providing a suspension of the agent in the water; such concentrates may contain as much as 75 percent, or even more, active agent.

In terms of the amount of active agent actually applied, in many cases effective control of undesirable plant life can be obtained using as little as about 0.5 pound of the agent per acre, although of course in other cases somewhat greater quantities of the agent—up to 50 pounds per acre—may be required, or found to be desirable. Ordinarily a dosage of from about 5 to about 30 pounds per acre will be found suitable. The selective activity of the sulfonium salts is most marked at the lower dosages—i.e., usually from about 1 to about 10 or 15 pounds per acre. Where aquatic vegetation is to be destroyed, a concentration of active agent of but a few parts (i.e., 5-50) per million based on the weight of the water often will be effective, although in other cases higher concentrations may be found desirable.

Where the sulfonium salt is insufficiently soluble in water, it may be applied as a suspension in water. Alternatively, where the use of water is undesirable, a suitable organic liquid carrier can be used, the sulfonium salt being dissolved and/or dispersed in the carrier. For this purpose, any of the usual non-phytotoxic liquid organic carriers known in the art can be used. Where a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, oils of animal or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

A solution of the active agent may be applied as such to the plants or to the soil that is to be treated, or it may be suspended or emulsified in water or organic carrier and the suspension of emulsion applied to the plants or soil. The organic liquid compositions may contain a small amount of water as a solvent for the toxicant ingredient. In such compositions, the carrier comprises an emulsion, namely a mixture of water, emulsifying agent and organic liquid. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred. Suitable non-ionic agents which may be used are available commercially as, for example, Triton X-100 and Lissapol N—believed to be condensation products of alkylphenols with ethylene oxide—and Tweens—believed to be condensation products of ethylene oxide and higher fatty acid esters, for example, oleic acid ester of anhydrosorbitols. Ordinarily, a minor amount—for example, about 0.5% to about 10% by weight—of the emulsifying agent will be used.

The invention includes novel compositions of matter wherein the active agent is absorbed or adsorbed in or on a sorptive carrier, such as finely divided clay, talc, gypsum, lime, wood flour, fuller's earth, kieselguhr, or the like, as well as the solid sulfonium salts of solid acids. The solid composition, or dust, may contain from as little as 1% by weight of active material to 50% by weight of active material, or even more. It may be prepared as a dust particularly for application to the growing plants, or as granules designed to be broadcast or to be worked into the soil. Compositions formulated as wettable powders are particularly suitable for application on plants. Wettable powders can be prepared suitable for suspension in water with or without the aid of conventional dispersing or deflocculating agents and with or without such adjuvants as oils, stickers, wetting agents, etc. Effective solid diluents, pulverulent or granular in form, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid-washed bentonite, precipitated calcium phosphate, precipitated calcium carbonate and colloidal silica. These diluents may represent a substantial portion, for example 50 to 98 percent by weight, of the entire formulation as applied to plant or soil.

The growth-regulating compositions may contain one or more of the herbicidal sulfonium salts set out hereinbefore as the sole active agent, or they may contain in addition thereto other biologically active substances. Other plant regulators, such as naphthaleneacetic acid, 2,4-dichlorophenoxyacetic acid and the like, as well as insecticides, e.g., DDT, endrin, dieldrin, aldrin, chlordane, systox, methoxychlor, rotaenone and pyrethrum, and fungicides, such as copper compounds, ferbam, captan, and the like, may if desired, be incorporated in the compositions.

The plant growth-modifying properties of the sulfonium salts of this invention were ascertained by the following tests.

I. *Spray test.*—The effect of spraying the sulfonium salts of this invention directly upon the surface of growing plants was determined. A composition containing 2.5 percent by weight of the test material dissolved in 20 milliliters of water containing 1 percent by weight of Tween 20 as surface-active agent was sprayed at the rate of 40 gallons per acre upon the test plants. The plants then were placed in a greenhouse and the results of the spray determined by visual inspection of the plants two weeks after the spray. The test plants were Bermuda grass (*Cynodon dactylon*), carpetgrass (*Axonopus compressus*), and radish (*Raphinus sativus*). Radish is used because it is very sensitive to most herbicides. In this test, the sulfonium salt gave the following results:

Trimethylsulfonium bromide, trimethylsulfonium methyl sulfate, trimethylsulfonium chloride, trimethylsulfonium perchlorate, ethyldimethylsulfonium bromide, trimethylsulfonium thiocyanate and trimethylsulfonium p-toluenesulfonate all were found to kill the growing points of Bermuda grass. None affected radish. All but the thiocyanate stunted carpetgrass but did not kill it; the thiocyanate killed it.

In other spray tests designed to tell herbicides from merely phytotoxic materials, four crops—maize (*Zea mays*), barley (*Hordeum vulgaris*), soybean (*Soja max*), and cotton (*Gossypium hirsutum*)—and four weeds—pigweed (*Amaranthus retroflexus*), annual rye grass (*Lolium multiflorum*), crabgrass (*Digitaria sanguinalis*), and mustard (*Brassica nigra*)—are simultaneously sprayed with a composition containing the toxicant. Results of the spraying are determined by visual inspection about two weeks later. Typical species of the sulfonium salts of this invention were tested by this procedure, with the following results:

Trimethylsulfonium bromide, trimethylsulfonium methyl sulfate, trimethylsulfonium chloride, trimethylsulfonium perchlorate, ethyldimethylsulfonium bromide, trimethylsulfonium thiocyanate and trimethylsulfonium p-toluenesulfonate all were found to kill the growing points of Bermuda grass. None affected radish. All but the thiocyanate stunted carpetgrass but did not kill it; the thiocyanate killed it.

In other spray tests designed to tell herbicides from merely phytotoxic materials, four crops—maize (*Zea mays*), barley (*Hordeum vulgaris*), soybean (*Soja max*), and cotton (*Gossypium hirsutum*)—and four weeds—pigweed (*Amaranthus retroflexus*), annual rye grass (*Lolium multiflorum*), crabgrass (*Digitaria sanguinalis*), and mustard (*Brassica nigra*)—are simultaneously sprayed with a composition containing the toxicant. Results of the spraying are determined by visual inspection about two weeks later. Typical species of the sulfonium salts of this invention were tested by this procedure, with the following results:

Trimethylsulfonium bromide: at dosages of 5–10 pounds per acre, kills the growing points of crabgrass; kills maize; kills cotton; did not affect mustard or soybean; did not affect barley; did not affect ryegrass; severely damaged or killed pigweed.

Trimethylsulfonium thiocyanate was as active as trimethylsulfonium bromide.

Trimethylsulfonium methyl sulfate, trimethylsulfonium chloride, trimethylsulfonium perchlorate, and trimethylsulfonium p-toluenesulfonate all showed the same pattern of herbicidal activity as trimethylsulfonium bromide.

II. *Duckweed (Lemna minor) test.*—The effect of a toxicant upon multiplying and growing leaf cells, and its effectiveness in an aquatic environment are determined by placing three strile plantlets of duckweed (*Lemna minor*) in a container containing sterile nutrients, 1% sucrose and the toxicant. The plants then are exposed to constant illumination and temperature of 75° F. After 7 days, when the check plants will have covered the surface area of the solution, the growth-reducing effect of the toxicant is visually evaluated. Testing of typical species of the herbicides of this invention by this procedure gave the following results:

Trimethylsulfonium bromide killed all of the plants at a dosage of ten parts per million (p.p.m.) based on the weight of solution. In some cases it killed at a dosage of one p.p.m., while in all cases, it severely inhibited growth of the plants at a dosage of one p.p.m. Others tested were trimethylsulfonium methyl sulfate, trimethylsulfonium chloride, trimethylsulfonium perchlorate, trimethylsulfonium thiocyanate and trimethylsulfonium p-toluenesulfonate. All were found to kill or severely inhibit the growth of the duckweed plants at a dosage of ten parts per million.

III. *Soil tests.*—To ascertain the activity of the sulfonium salts of this invention when applied via the soil, the most active in spray tests were tested via soil application. The tests were carried out as follows: Moist sterile soil was placed in containers. Soil mixed with toxicant was then placed on top of the moist soil. Small, approximately equal, amounts of the seeds of the test plants were placed in each container on top of the toxicant-impregnated soil. Moist sterile soil was placed on top of the seeds. The contents of the containers then were watered and the containers held under identical conditions in a greenhouse for 10–14 days. The effect of the toxicant was then determined by visual observation of the plants growing in the soil, if any. In comparable tests, equal amounts of the toxicant and added soil were used. In each series of tests, a control blank was run—no toxicant was added to the soil. The test plants used were millet (Setaria italica), a narrow-leaved plant, and cress (Lepidium sativa), a broad-leaved plant.

It was found that trimethylsulfonium bromide caused marked stunting of the millet at a dosage of 10 pounds per acre, and killed the millet at a dosage of 100 pounds per acre. It only stunted the cress at a dosage of 100 pounds per acre.

Trimethylsulfonium perchlorate was found to be more active than trimethylsulfonium bromide, while trimethylsulfonium thiocyanate was found to kill both millet and cress at a dosage of 10 pounds per acre.

It is thus evident that while these new sulfonium salts can be used as preemergence herbicides, their activity for this use is less than their activity when applied directly to already growing plants.

From the foregoing, it will be evident that the sulfonium salts of this invention possess unique properties which enable them to be used to great advantage for certain applications wherein it is desired to control growth of plants without killing the plants.

Outstanding among these properties is the fact that these salts are not general plant poisons at low concentrations, but at those concentrations attack and destroy only the growth points—the buds—of the living plants, without significantly affecting the general health of the plants. Further, at low concentrations, these sulfonium salts do not appear to translocate significantly—that is, when sprayed upon but a part of the surface of a plant, only that part of the plant contacted by the salts is directly affected.

As has already been pointed out herein, these properties may be exploited in the control of lawns, parking area covers, and like applications for ground cover by perennial grass. These properties may also be exploited to provide control of growth of other plants that grow by means of buds located upon branches (as distinguished from plants which grow from a central growth point at or near ground level). Thus, in the case of cotton or other bud-propagated crops ordinarily grown in rows, these sulfonium salts can be used in appropriate low concentrations to stop growth at any particular desired height which will enable the most efficient picking of the crop by mechanical pickers. To control the growth, all that is necessary is to contact with one or more of the sulfonium salts described herein the growth points on that part of the plant, the growth of which is no longer desired. A typical example of such a use for these salts is their use as a "chemical topper" for cotton, to limit the vertical growth of the cotton plants.

The unique properties of these sulfonium salts also can be exploited to prevent re-growth following defoliation. Thus, in the harvesting of cotton, it is customary practice in many areas to treat the mature plant with a defoliant at a time when the bolls are nearly ripe, so that the sun can contact the bolls, thus insuring their uniform ripening and preventing or reducing rot, and also to reduce the amount of foliage and waste matter—trash—that the picker, whether human or mechanical, must contend with in harvesting the bolls. Defoliation also is practiced in situations where the amount of foliage, particularly where growth is rank, causes the plants to "lodge"—that is, to fall over and lie upon one another and/or upon the ground. However, harvest cannot be accomplished for a period of from several days to as much as three or four weeks after the defoliant has been applied, to permit the leaves to abscise and drop from the plant. During this time, particularly if the plants have been recently irrigated and/or rain occurs, the cotton plants will put forth new growth—removal of the mature leaves seems to stimulate rapid new growth. Such new growth is highly undesirable when mechanical pickers are used, since the new growth is easily bruised, and the chlorophyll therein stains the cotton, requiring that it be bleached and thus reducing its value.

It has been found that the sulfonium salts described herein effectively halt such regrowth, when applied at the time the defoliant is applied. Alternatively, or additionally, the sulfonium salts can be applied effectively after the defoliant has been applied.

The effectiveness of the sulfonium salts for this purpose is shown by the results of tests which have been made. In these tests, trimethylsulfonium chloride was applied alone and in combination with 5 pounds per acre of commercial magnesium chlorate to mature cotton plants ready to harvest. The dosages of trimethylsulfonium chloride used were 2.5, 5 and 10 pounds per acre. The results of these tests showed decisively that at rates of 5 pounds or more of trimethylsulfonium chloride per acre, secondary growth of the cotton plant was completely inhibited while at a dosage of 2.5 pounds trimethylsulfonium chloride per acre, 90% of the secondary growth was prevented. The determination of the control of regrowth was determined by weighing the tops of the treated cotton plants, and comparing with untreated plants. Trimethylsulfonium chloride alone induced slow defoliation. The mixtures of trimethylsulfonium chloride and defoliant significantly speeded the defoliant action. Application of the trimethylsulfonium chloride did not apparently affect the quality and color of the cotton.

The action of these sulfonium salts in preventing regrowth apparently is independent of the defoliating action of the defoliant, so that the sulfonium salts can be used with the defoliant or after the defoliant has been applied, and as far as is known can be used with any defoliant. The sulfonium salt and defoliant can be applied together in combination if they are chemically inert with respect to each other, or they may be applied separately but at substantially the same time, or the sulfonium salt can be applied some time after the defoliant has been applied. Combinations of these treatments can also be used to advantage in some cases, with conformance to the general rule that it is probably best not to apply the sulfonium salt prior to application of the defoliant—for if the sulfonium salt is applied first, probably more of it will be required and/or the treatment may not be as effective, for the sulfonium salts destroy only the growth points they contact, and the existing foliage can mask a substantial proportion of the growth points and prevent their being contacted with the sulfonium salt.

As has already been pointed out, the sulfonium salts can be applied in combination with defoliants generally. Typical defoliants that can be mentioned for the purpose of illustration include, in addition to magnesium chlorate, calcium cyanamide, ammonium thiocyanate, potassium thiocyanate, sodium chlorate-sodium pentaborate mixtures, sodium monochloroacetate, potassium cyanate, sodium thiocyanate, sodium ethyl xanthate, disodium 3,6-endoexohexahydrophthalate, sodium chlorate-sodium pentaborate-sodium tetraborate mixtures, pentachlorophenol, sodium dichromate, tributyl phosphorotrithioite, S,S,S-tributyl phosphorotrithioate, 1,1'-ethylene-2,2'-dipyridylium dibromide, and the like.

While cotton is the plant most frequently defoliated before harvest, defoliation of other plants before harvest is also being developed. In general, the crops which can be most satisfactorily defoliated are the perennials, which at maturity most readily lose their leaves without damage to the general health of the plants. The sulfonium salts herein described will also be effective in preventing regrowth of these other plants which have been defoliated.

This application is a continuation-in-part of our copending application Serial No. 7,753, filed February 10, 1960, now abandoned.

We claim as our invention:

1. A method for preventing undesired growth of a plant, which comprises bringing that portion of the plant whose further growth is unwanted into contact with an effective amount of a sulfonium salt of the formula:

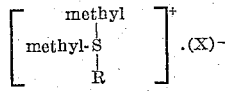

wherein R represents alkyl of from 1 to 2 carbon atoms and X represents an anion of the group consisting of the acid sulfate ion, $HSO_4^-$; its esters $R^0SO_4^-$ wherein $R^0$ contains up to 10 carbon atoms and is a member of the group consisting of alkyl, aryl, and aralkyl, and such hydrocarbon radicals substituted by from one to a plurality of substituents of the group consisting of halogen and nitro; the chlorate ion; the perchlorate ion; the thiocyanate ion; the nitrate ion; the phosphate ion, $PO_4^{-3}$; its partial esters, $R^0PO_4^{-2}$ and $R^0R^0PO_4^-$ wherein $R^0$ has the aforesaid meaning; the acid phosphate ions, $H_2PO_4^-$ and $HPO_4^{-2}$; the cyanide ion, the borate ions, $BO_2^-$, $BO_3^-$ and $B_4O_7^{-2}$; the carbonate ion; the bicarbonate ion; the chromate ion; the permanganate ion; the arsenate ions, $AsO_3^-$, $As_2O_7^{-4}$, $H_2AsO_4^-$; the arsenite ions; the carbamate ion; alkanesulfonyl radicals of up to 10 carbon atoms and aryl hydrocarbon sulfonyl radicals of up to 10 carbon atoms; carboxylic acid anions, $(R^0-C(O)-)^-$ wherein $R^0$ has the aforesaid meaning.

2. A method for preventing the growth of a bud of a living plant, which comprises bringing said bud into contact with a toxic amount of sulfonium salt defined in claim 1.

3. A method for preventing regrowth of the foliage of a plant following chemical defoliation of the plant, which comprises bringing the buds of said plant into contact with a toxic amount of a sulfonium salt defined in claim 1.

4. A method according to claim 1 wherein the salt is a trimethylsulfonium halide.

5. A method according to claim 1 wherein the salt is trimethylsulfonium thiocyanate.

6. A method according to claim 1 wherein the salt is trimethylsulfonium chloride.

7. A method according to claim 1 wherein the salt is trimethylsulfonium bromide.

8. A method according to claim 3 wherein the said trimethylsulfonium compound is applied to the buds of said plant at substantially the same time as the defoliant is applied to the plant.

9. A method according to claim 3 wherein the said trimethylsulfonium compound is applied to the buds of said plant after the defoliant has been applied to the plant.

References Cited in the file of this patent
UNITED STATES PATENTS

| | | |
|---|---|---|
| 2,813,898 | Gaertner | Nov. 19, 1957 |
| 2,854,791 | Antognini | Oct. 7, 1958 |